May 4, 1965
C. E. HUMES
3,181,914
TRUCK ASSEMBLY
Filed March 5, 1963
7 Sheets-Sheet 1
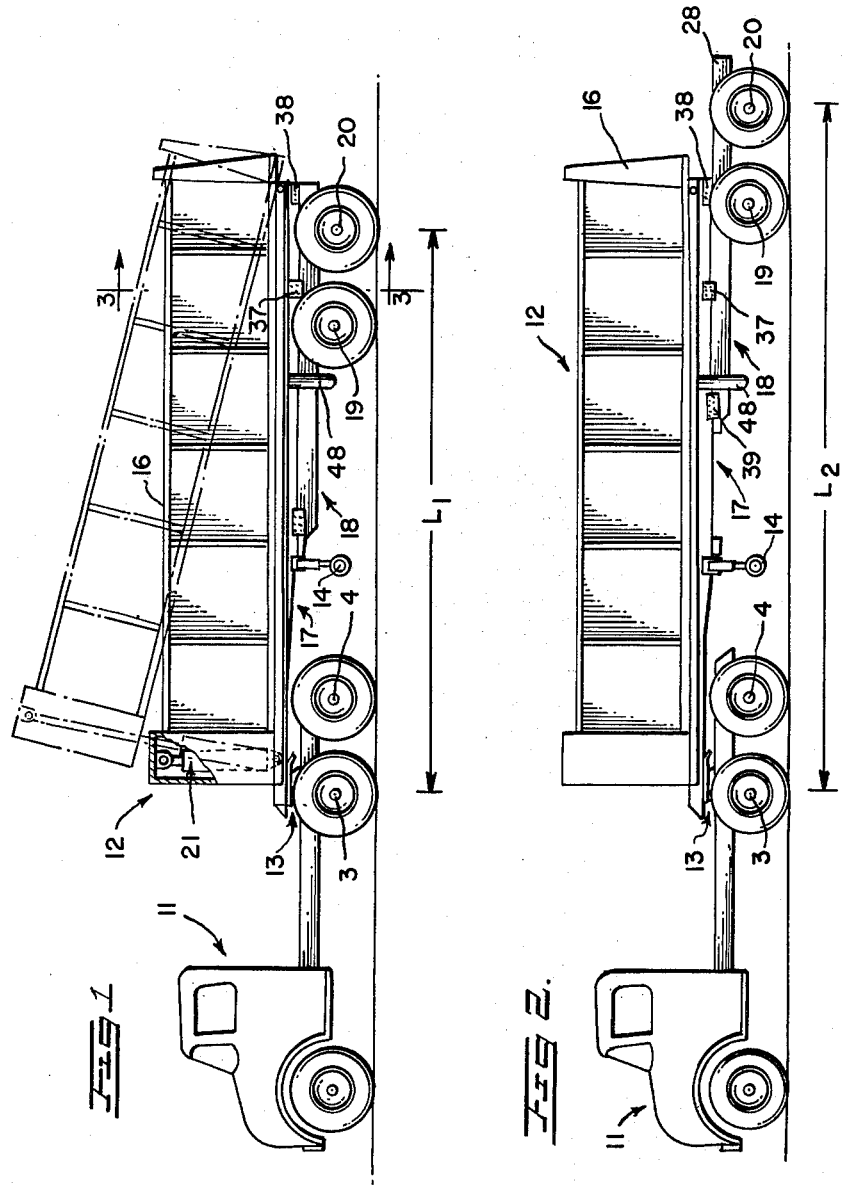
INVENTOR.
CARL E. HUMES
BY *Stowell & Stowell*
ATTORNEY

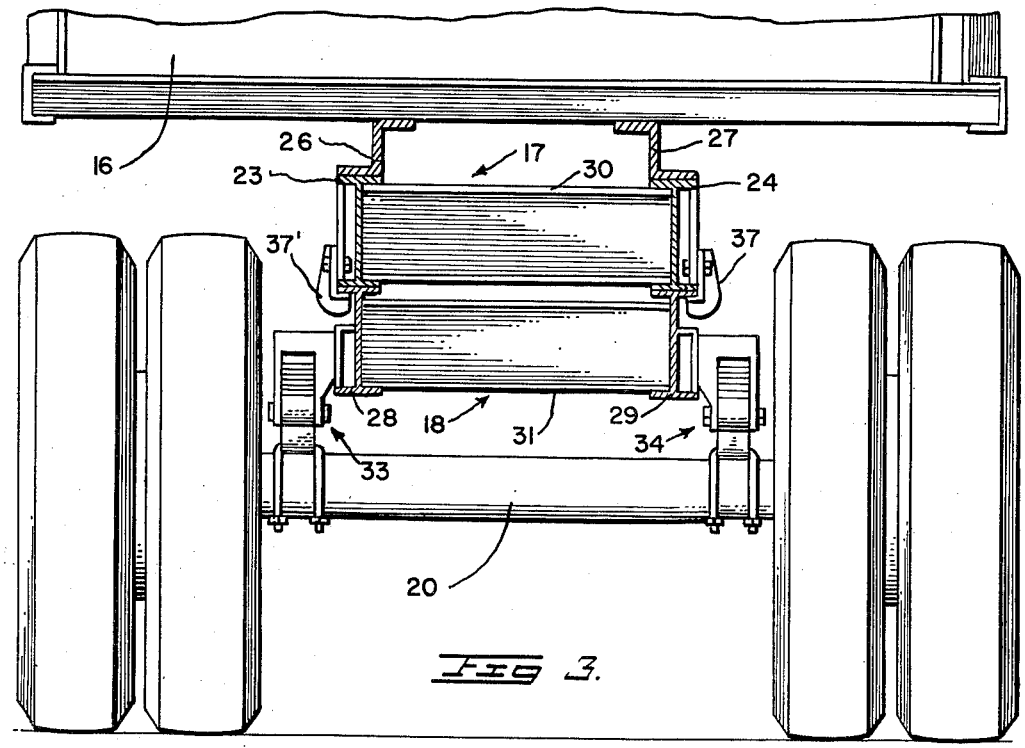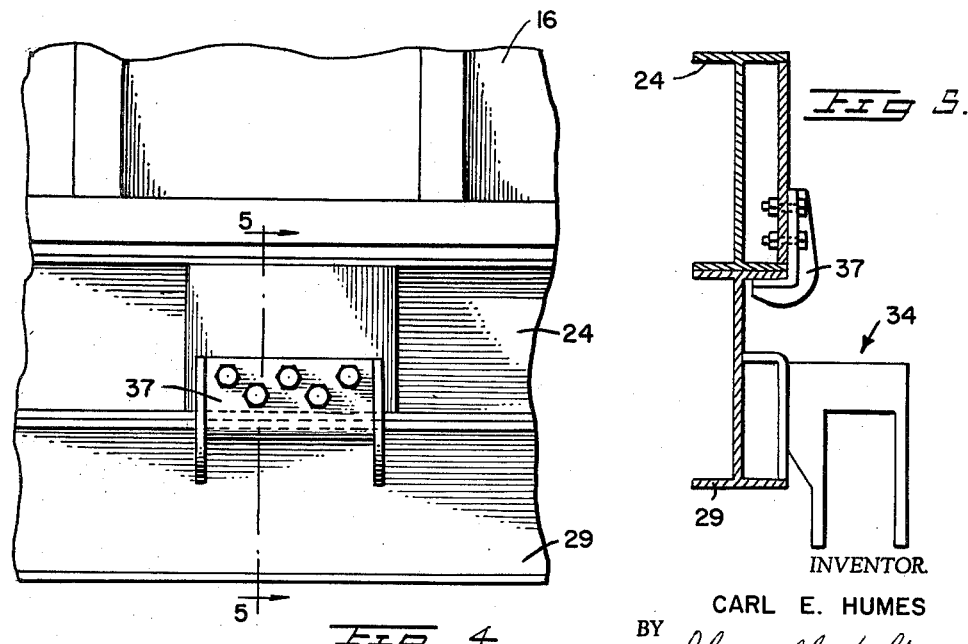

May 4, 1965
C. E. HUMES
3,181,914
TRUCK ASSEMBLY
Filed March 5, 1963
7 Sheets-Sheet 3
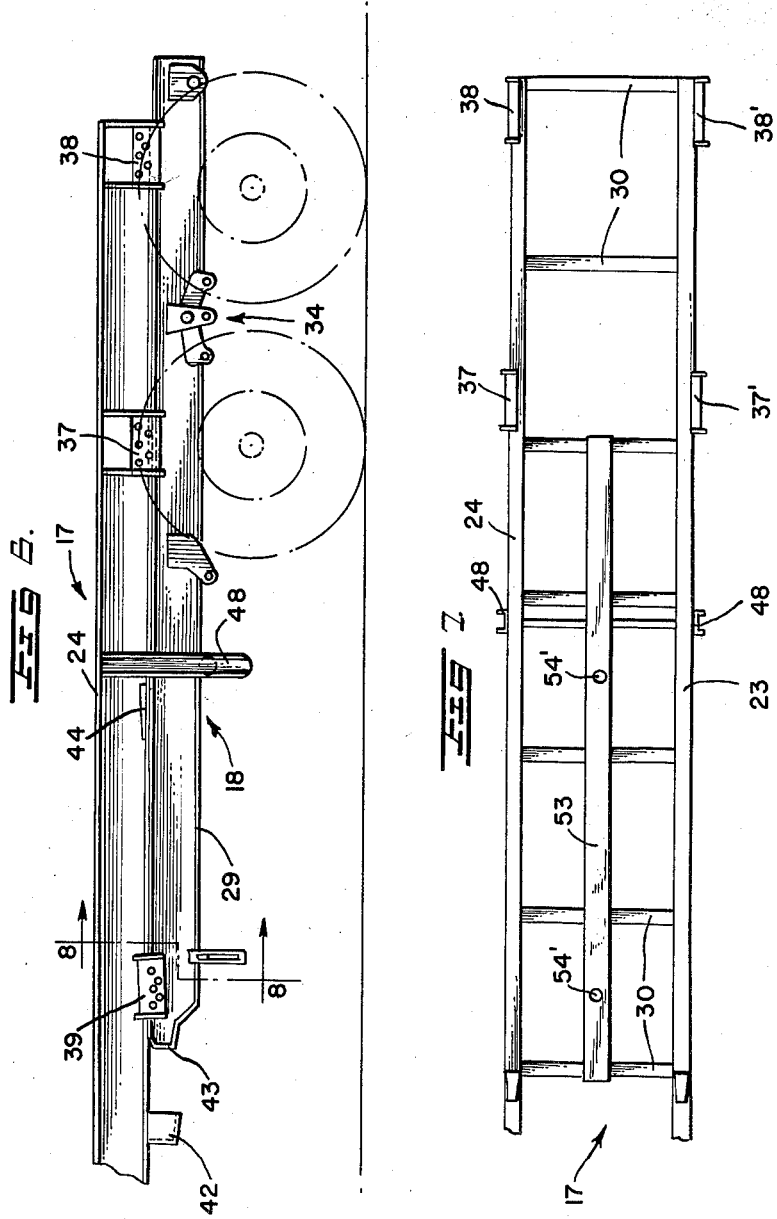
INVENTOR.
CARL E. HUMES
BY Stowell & Stowell
ATTORNEY

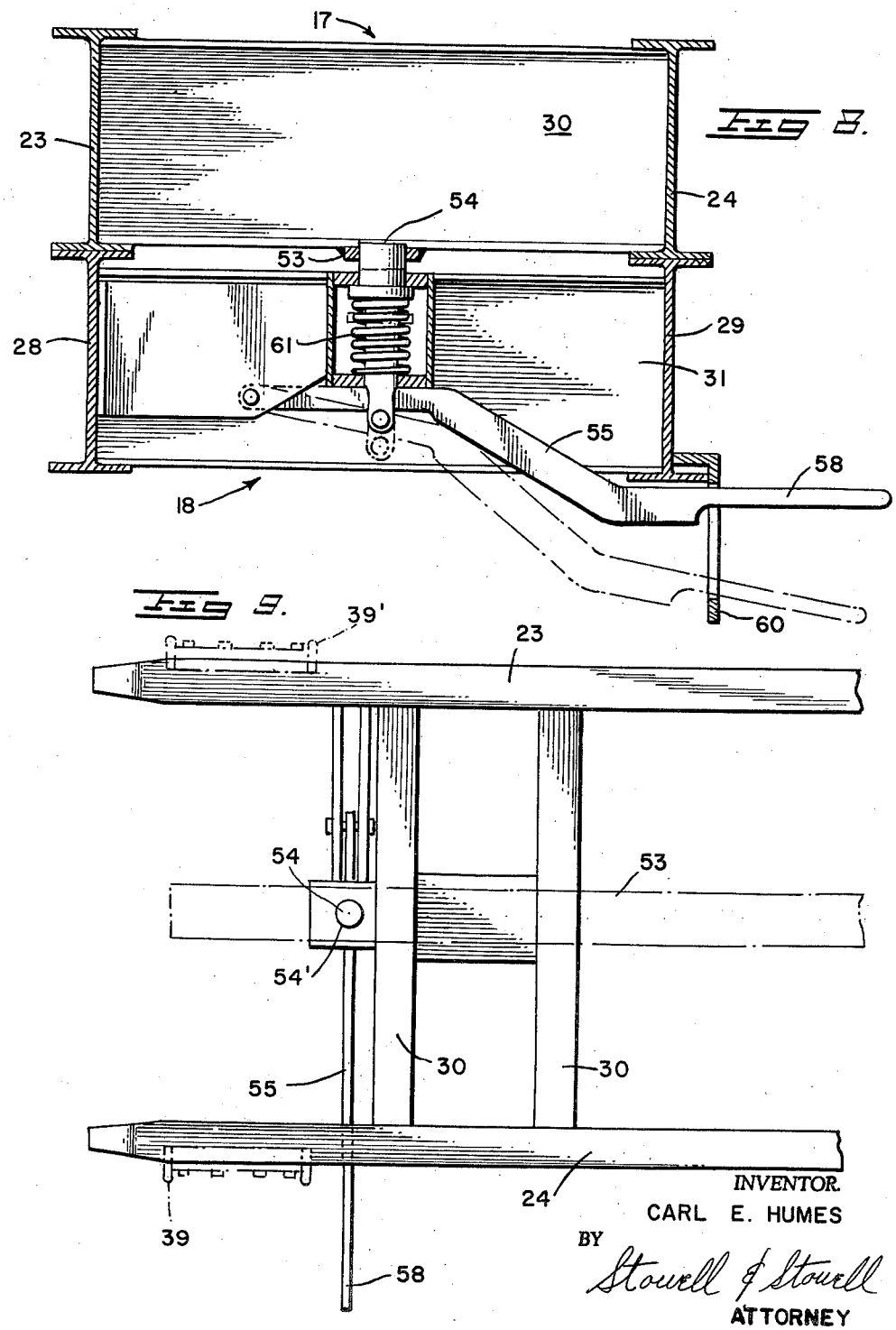

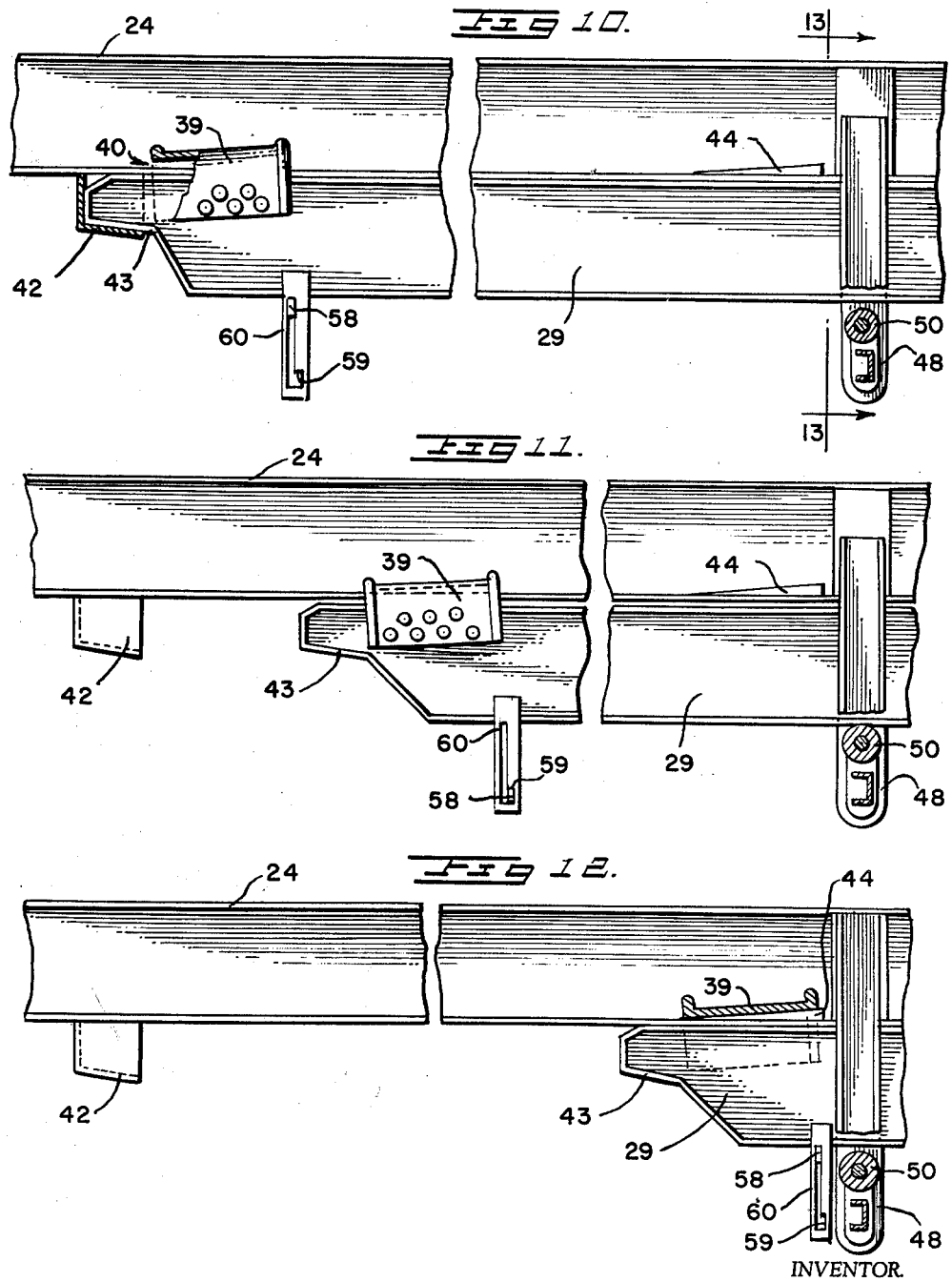

May 4, 1965     C. E. HUMES     3,181,914
TRUCK ASSEMBLY
Filed March 5, 1963     7 Sheets-Sheet 6
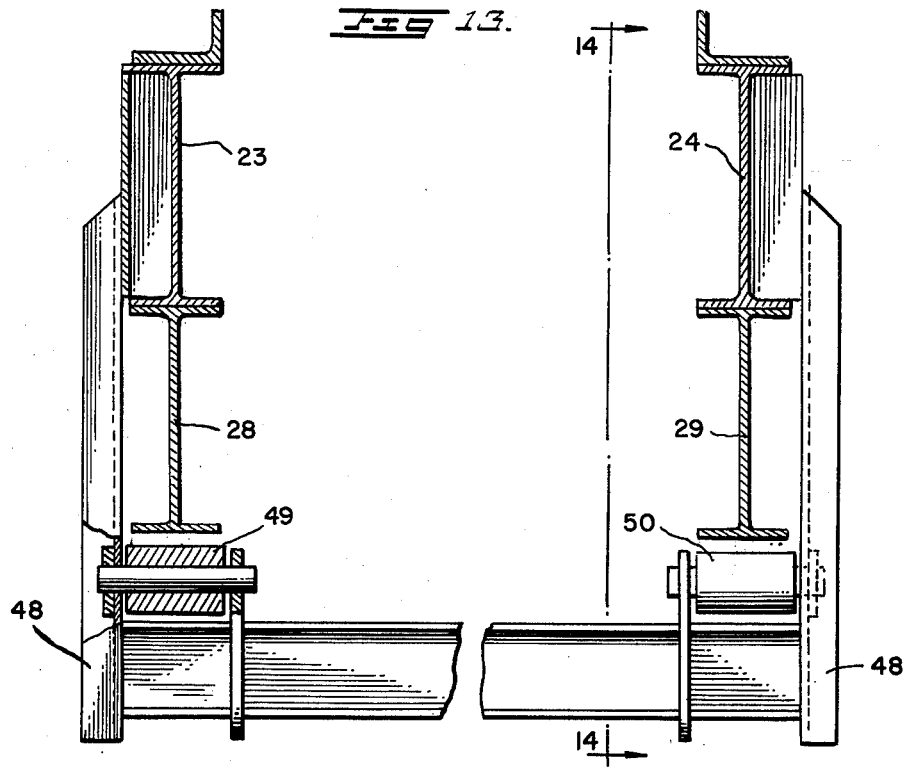
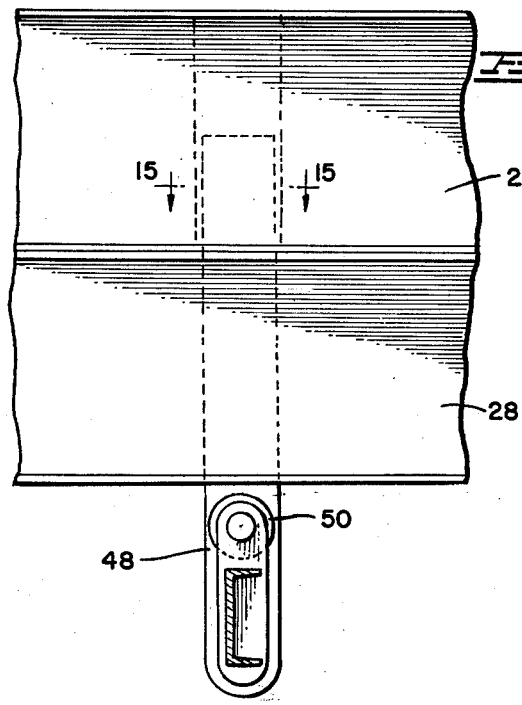
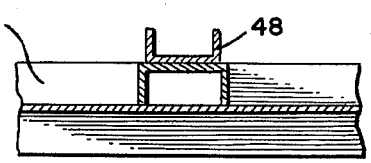
INVENTOR.
CARL E. HUMES
BY *Stowell & Stowell*
ATTORNEY

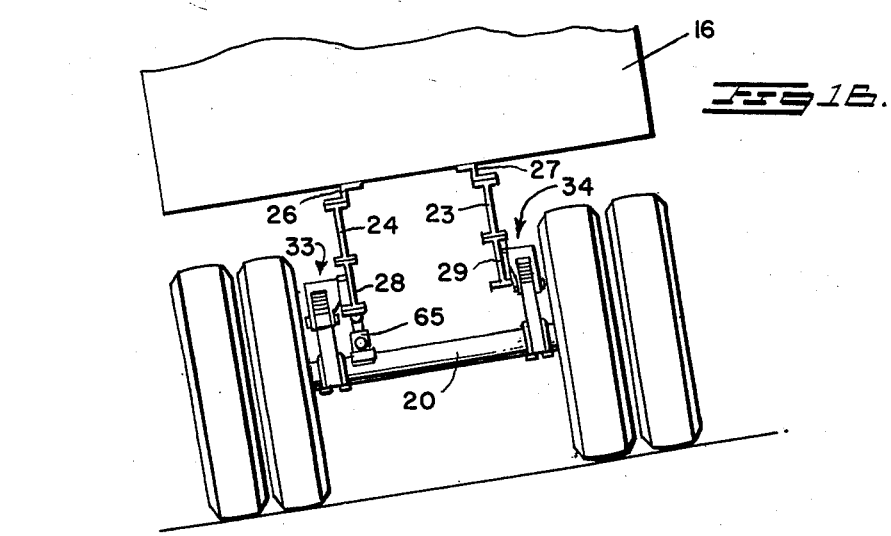
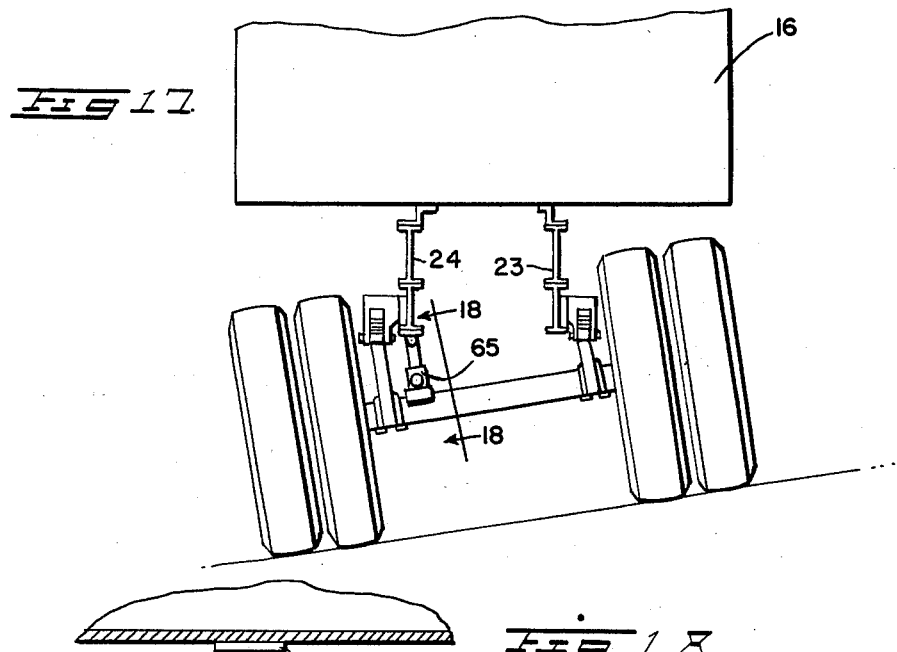
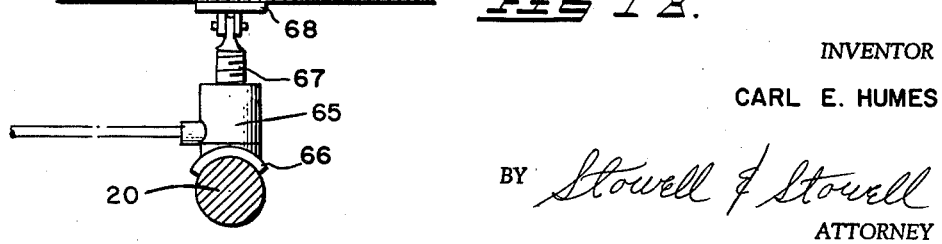

3,181,914
TRUCK ASSEMBLY
Carl E. Humes, 907 Franklin Ave., Steubenville, Ohio
Filed Mar. 5, 1963, Ser. No. 262,976
3 Claims. (Cl. 298—17)

The present invention relates to trucks, and more particularly to dump trucks.

In the United States, certain States have laws that limit the weight of a load that can be transported over a road by a truck. In some States, the legal limit is computed on a bridge formula basis. Therefore, if the distance between the front and back load carrying wheels of the truck is relatively large, the legal limit is greater than the legal limit for a truck that has a smaller distance between the front and back load carrying wheels.

The legal limit of the weight of a load that can be carried by a dump truck can be raised by lengthening the dump body and by increasing the distance between the front and back load carrying wheels of the truck. However, if the dump body is extremely long, it is impractical and very hazardous to dump the load. The longer the dump body, the more vulnerable it is to upset during the dumping operation, especially if the wheels of the truck are resting upon a laterally inclined surface.

Therefore, it is an object of the present invention to provide a truck that can be modified easily and quickly for increasing the legal limit of the weight of a load that can be transported by the truck to comply with the laws of certain localities that compute the legal limit on a bridge formula basis.

Another object is to provide a dump truck that has a relatively large legal weight carrying limit and also a truck that is practical to dump.

Still another object is to provide a dump truck that is practical to dump even though the wheels of the truck are resting upon a laterally inclined surface.

A further object is to provide a dump truck that has an adjustable chassis which can be easily increased in length for raising the legal weight carrying limit of the truck and which can be easily decreased in length for permitting a dump body to discharge its load at the rear of the truck.

Still a further object is to provide such a dump truck that is simple to build and is constructed ruggedly.

Still another object is to provide a truck that has a semi-trailer which can be lengthened for increasing the legal limit of its weight carrying capacity and which can be shortened at the job for maneuvering the truck in and out of tight spots.

The foregoing objects are achieved in accordance with the present invention by providing a dump truck which comprises a dump body, a main frame for supporting the body, means for raising and lowering the front end of the body for discharging a load at the rear of the truck, a sub-frame for supporting the rear load carrying wheels of the truck, and means for adjusting the sub-frame relative to the main frame in a longitudinal or axial direction for changing the distance from the rear wheels to the front end of the main frame. The last-named means is adapted to be adjusted for selectively positioning the rear wheels in a first position that is beneath the rear of the dump body and a second position that is beyond the rear of the dump body.

The apparatus for achieving the foregoing objects, as well as for achieving other objects and advantages of the present invention, will become more apparent from the following detailed description of the accompanying drawings wherein:

FIGURE 1 is a side elevational view of a semi-trailer dump truck which has a chassis that can be adjusted in length in accordance with the present invention, this view showing the semi-trailer chassis in a retracted position and showing in phantom line the dump position of the dump body of the truck;

FIGURE 2 is a side elevational view of the truck shown in FIGURE 1, and shows the semi-trailer chassis in an extended position;

FIGURE 3 is an enlarged vertical sectional view taken from the line 3—3 in FIGURE 1, and shows in cross section the main frame and the sub-frame of the semi-trailer chassis, and also shows the means for mounting the dump body upon the main frame and the means for mounting the sub-frame upon the rear wheels of the truck;

FIGURE 4 is an enlarged fragmentary side elevational view of one of the angle brackets for securing the sub-frame to the main frame of the semi-trailer chassis;

FIGURE 5 is a cross sectional view taken from the line 5—5 of FIGURE 4;

FIGURE 6 is a side elevational view of the semi-trailer chassis and shows the sub-frame in a partially extended position;

FIGURE 7 is a bottom plan view of the main frame of the semi-trailer chassis and shows the slide stop bar of the means for locking the sub-frame to the main frame;

FIGURE 8 is an enlarged vertical sectional view taken from the line 8—8 in FIGURE 6, and shows the spring loaded locking pin of the means for locking the sub-frame to the main frame;

FIGURE 9 is a top plan view of FIGURE 8 and shows the previously mentioned slide stop bar in phantom line;

FIGURE 10 is an enlarged fragmentary side elevational view of the semi-trailer chassis and shows the sub-frame in its retracted position nested in a socket that is provided along the main frame;

FIGURE 11 is an enlarged fragmentary side elevational view of the semi-trailer chassis and shows the sub-frame in a partially extended position;

FIGURE 12 is an enlarged fragmentary side elevational view of the semi-trailer chassis and shows the sub-frame in a fully extended position and also shows the front angle bracket of the sub-frame nested upon a wedge secured to the main frame;

FIGURE 13 is an enlarged vertical sectional view taken from the line 13—13 in FIGURE 10 and shows the roller support brackets and the rollers upon which the sub-frame rolls while the sub-frame is moved axially relative to the main frame from one position to another;

FIGURE 14 is a side elevational view taken from the line 14—14 in FIGURE 13;

FIGURE 15 is a transverse sectional view taken from the line 15—15 in FIGURE 14;

FIGURE 16 is a schematic illustration of the rear of a semi-trailer dump truck like that shown in the previous views and shows the rear wheels of the truck resting upon an incline that extends laterally of the truck, and in addition shows a jack for leveling the dump body;

FIGURE 17 is a schematic illustration of the rear of a semi-trailer dump truck like that shown in FIGURE 16 and shows the dump body leveled by means of the jack; and FIGURE 18 is an enlarged fragmentary sectional view taken from the line 18—18 in FIGURE 17.

Referring to FIGURES 1 and 2 a semi-trailer dump truck is shown as comprising a towing tractor 11 and a semi-trailer 12. The semi-trailer is coupled to the tractor by a conventional fifth wheel 13. A pair of dollies, only one of which is shown in FIGURES 1 and 2 by 14, is carried by the semi-trailer to support the semi-trailer when it is disconnected from the towing tractor.

The semi-trailer 12 is composed of a dump body 16 and a chassis that comprises a main frame generally designated 17 and a sliding sub-frame generally designated 18. At one end of the sub-frame 18, tandem axles 19 and 20 carry two pairs of wheels, respectively, for supporting the rear end of the semi-trailer. Conventional hydraulic means, shown generally at 21, are employed for raising the dump body to discharge a load from the rear of the semi-trailer. A raised portion for the dump body is illustrated in FIGURE 1 by phantom line.

At the back end of the towing tractor 11, tandem axles 3 and 4 carry two pairs of wheels, respectively, for supporting the rear end of the tractor and for carrying the front end of the semi-trailer. Tandem axles 3, 4, 19 and 20 and the double pairs of wheels at the front and rear ends of the semi-trailer 12 are employed for the purpose of raising the legal limit of the weight of a load that can be transported by the dump body 16 compared with a truck that employs single axles and single pairs of wheels at opposite ends of the trailer.

In accordance with an important feature of this invention, the distance between the axle 3 at the front end of semi-trailer and the axle 20 at the rear end of the semi-trailer is adjustable for the purpose of raising the legal limit of the weight of the load that can be transported over a road by the dump body 16. This adjustment is achieved by the sliding sub-frame 18, which supports the axles 19 and 20 that carry the rear wheels of the semi-trailer. With the sub-frame 18 in a fully extended position, shown in FIGURE 2, the rear wheels carried by axle 20 are beyond the rear of the dump body 16 and the axle 20 is separated from the axle 3 by a maximum distance L2. In this fully extended position the legal limit of the weight that can be transported by dump body 16 may be at a maximum in those States or localities where the legal limit is computed on a bridge formula basis. The fully retracted position for the sub-frame 18 is shown in FIGURE 1, wherein the rear wheels carried by axle 20 are under the dump body 16 and the axle 20 is separated from the axle 3 by a minimum distance L1. In this fully retracted position, the load can easily be discharged from the rear of the dump body 16 beyond the rear wheels of the truck.

The details of the adjustable chassis of the semi-trailer 12 are shown more clearly in FIGURES 3–15. The main frame 17 of the adjustable chassis comprises a pair of I-beams 23 and 24 and a plurality of cross pieces interconnecting the I-beams in spaced relation. In FIGURE 3, one of these cross pieces is shown by 30. The supporting frame 26 and 27 of the dump body 16 is pivotally mounted to the I-beams 23 and 24 adjacent the rear end of the vehicle.

The sliding sub-frame of the adjustable chassis comprises a pair of I-beams 28 and 29 and a plurality of cross pieces for supporting the I-beams 28 and 29. In FIGURE 3, one of the cross pieces is shown by 31. The axles 19 and 20 are suspended from the sub-frame I-beams 28 and 29 by conventional spring suspension means generally indicated at 33 and 34.

To permit the sub-frame 18 to slide longitudinally relative to the main frame, two pairs of angle brackets 37, 37' and 38, 38' are secured to the main frame 17 and one pair of angle brackets 39, 39' is secured to the sub-frame 18. Each of the pair of angle brackets 38, 38' is, for example, bolted to its respective I-beam 24 or 23 and is located at the rear end of the main frame, as shown in FIGURES 3 and 6, for example. The pair of angle brackets 37, 37' is also bolted to the I-beams 24 and 23. The brackets 37, 37' are spaced from the rear end of the main frame as is shown in FIGURE 6, for example. The angle brackets 39, 39' are bolted to the sub-frame I-beams 29 and 28. The brackets 39 are located at the front end of the sub-frame as is shown in FIGURE 6, for example.

The pairs of angle brackets 37, 37' and 38, 38' hold the sub-frame 18 securely against the main frame 17 and prevent lateral and vertical movement of the sub-frame while permitting the sub-frame to be slid axially relative to the main frame. The pair of angle brackets 39, 39' on each side of the sub-frame helps prevent lateral movement of the sub-frame relative to the main frame while permitting axial movement between the sub-frame and main frame. Normally there is a gap between the pair of angle brackets 39, 39' and the main frame 17. In FIGURE 10, this gap is shown by 40.

As is illustrated in FIGURE 10, for example, a wedge socket 42 is attached to I-beam 24 of the main frame to hold a conforming front end 43 of the I-beam 29 of the sub-frame securely to the main frame when the sub-frame is in a fully retracted position as is shown in FIGURE 10. For the same purpose, there is provided a corresponding wedge socket for I-beam 23 and a conforming front end for the I-beam 28 on the other side of the frames, not shown in FIGURE 10.

A wedge 44 is attached to I-beam 24 of the main frame to hold a conforming socket inside of the angle bracket 39 securely to the main frame when the sub-frame is in a fully extended position as is shown in FIGURE 12. A similar wedge, not shown, is attached to the other main frame I-beam 23 for the same purpose.

Beneath the sub-frame I-beams 28 and 29, a pair of rollers 49 and 50 is supported by a U-shaped roller support bracket 48 that is suspended from the I-beams 23 and 24 of the main frame. As is shown in FIGURES 10–12, for example, the bracket 48 is positioned rearwardly of the wedge 44 and rearwardly of the corresponding wedge on the other side of the main frame. If the dump body of the truck is filled with a heavy load, the sub-frame I-beams ride along the rollers 49 and 50 during the time the sub-frame is being adjusted from a fully extended position to a fully retracted position relative to the main frame. During this time, the gaps 40 between the angle brackets 38, 38' and the main frame are closed and these angle brackets slide along the main frame as is shown in FIGURE 11.

In order to lock the sub-frame axially along the main frame, a slide stop bar 53 is rigidly attached to the cross member 30 of the main frame, as is shown in FIGURES 8 and 9. A spring loaded lock pin 54 is mounted upon the sub-frame 18 for cooperating with suitable openings 54' along the stop bar 53 to selectively lock the sub-frame axially in its fully retracted position or its fully extended position. The lock pin 54 is operated by a lever 55. The lever 55 extends laterally from the side of the sub-frame so that it can be easily operated by hand by means of handle 58. A slot 59 provided at the bottom of a handle guide bracket 60, shown in FIGURES 10–12, permits the handle to be locked in its downward position to maintain the pin 54 in a retracted position against the bias of its spring 61 during the time the sub-frame 18 is being adjusted relative to the main frame 17.

The operation of the truck is as follows. While the truck is being loaded, the sub-frame 18 is locked in a fully extended position relative to the main frame 17. To attain this fully extended position, stops are placed in front of the rear wheels of the semi-trailer, the hand lever 58 is operated to withdraw the locking pin 54 from the stop bar 53, the hand lever 58 is locked in its lower position, the towing tractor 11 is driven forward to slide the main frame 17 and the dump body forwardly of the rear wheels of the semi-trailer 18, and the hand lever is unlocked to permit the spring biased locking pin to pass through the stop bar 53 to lock the sub-frame 18 in its fully extended position. Thus, the distance between the front and rear load carrying wheels of the dump truck is at a maximum for transporting the load to a destination whereat the load is to be dumped.

Upon arriving at its destination, the dump truck is stopped and the sub-frame 18 is locked in a fully retracted position relative to the main frame 17 as follows. Stops are placed in back of the rear wheels of the semi-trailer, the hand lever is operated to withdraw the locking pin 54 from the stop bar 53, the hand lever 58 is locked in its lower position, the towing tractor is driven backwards to slide the main frame and the dump body backwardly relative to the sub-frame 18 until the sub-frame is fully retracted, and the hand lever is unlocked to permit the spring biased locking pin to lock the sub-frame in its fully retracted position. Thus, the truck can be maneuvered more easily in and out of tight spots at the dumping destination, and the dump body is in a proper position to discharge a load from the rear of the truck.

In the foregoing construction the length of the dump body 16 is limited by its vulnerability to upset during the dumping operation. If the wheels of the truck are resting upon a laterally inclined surface instead of resting upon a horizontal surface, the dump truck is more likely to upset and is more hazardous to dump. This disadvantage is overcome in accordance with another important feature of the invention by the apparatus shown in FIGURES 16–18.

A jack 65, which is supported between the axle 20 and one of the sub-frame I-beams 28 or 29 (depending upon the direction of the lateral incline), is employed to raise the lower side of the rear of the dump body 16 to a generally horizontal position. In FIGURE 17, the dump body 16 has been raised to a level or horizontal position by suitable adjustment of the jack 65. The jack, which is hand operated by a lever shown in phantom line in FIGURE 18, includes a curved base 66 that conforms to axle 20, an axially adjustable threaded support member 67, a tiltable upper member 68 that is adapted to be held either to I-beam 28 or to I-beam 29 while the jack is being adjusted, and a mating threaded member 69. The threaded member 69 is provided with a removable lever arm 70. Once the dump body is leveled, it is much safer to raise the dump body and to dump a load from the rear of the body. Moreover, dump bodies of longer than usual length can be employed safely in conjunction with the adjustable length chassis of the semi-trailer to further increase the legal limit of the weight of a load that can be transported by the dump truck.

It is apparent that changes can be made in the apparatus described above without departing from the scope of the invention and that other words of description might be used to describe the invention.

What is claimed is:

1. A dump truck comprising a dump body that is adapted to be raised and lowered at one end for dumping a load from the rear of said body, a chassis having a main frame and a sliding sub-frame, means for mounting said dump body upon said main frame, means for mounting rear wheels upon said sliding sub-frame, means for locking said sub-frame in one position axially of said main frame so that said rear wheels are beneath said dump body, and means for locking said sub-frame in another position axially of said main frame so that said rear wheels are beyond the rear of said dump body.

2. A dump truck including a main frame, means pivotally mounting a dump body on the main frame with the pivotal axis of the pivotal mounting means being positioned adjacent the rear end of the main frame, a sub-frame, rear wheel mounting means on said sub-frame, and means mounting said sub-frame for longitudinal movement for positioning the rear wheel mounting means forwardly of the pivotal mounting between the main frame and the dump body to permit dumping of the dump body and to an extended rearward position to increase the distance between the rear wheel mounting means and the front support wheels for the dump truck.

3. The invention defined in claim 2 including means for locking said sub-frame in said two positions.

References Cited by the Examiner
UNITED STATES PATENTS

| 2,556,610 | 6/51 | Biszantz | 298—17 |
| 2,717,707 | 9/55 | Martin | 280—80 |
| 2,835,504 | 5/58 | Acker | 280—80 |

FOREIGN PATENTS

| 513,694 | 2/55 | Italy. |

MILTON BUCHLER, *Primary Examiner.*

R. DAVID BLAKESLEE, *Examiner.*